(12) United States Patent  (10) Patent No.: US 8,553,578 B2
Alshinnawi et al.  (45) Date of Patent: Oct. 8, 2013

(54) AUTOMATED PROTOCOL SELECTION FOR HOST ADAPTER CARD

(75) Inventors: Shareef F. Alshinnawi, Durham, NC (US); John J. Struble, Jr., Mebane, NC (US); Edward S. Suffern, Chapel Hill, NC (US); J. Mark Weber, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/042,563

(22) Filed: Mar. 8, 2011

(65) Prior Publication Data

US 2012/0233368 A1  Sep. 13, 2012

(51) Int. Cl.
*G06F 13/00*  (2006.01)

(52) U.S. Cl.
USPC .......................................... 370/252

(58) Field of Classification Search
USPC .......................................... 370/252, 464, 431
See application file for complete search history.

(56) References Cited

U.S. PATENT DOCUMENTS

| 7,179,096 | B2 | 2/2007 | Dube et al. |
| RE41,707 | E * | 9/2010 | Funakoshi ........................ 725/118 |
| 2008/0044141 | A1 | 2/2008 | Willis et al. |
| 2009/0022497 | A1 | 1/2009 | Mateosky et al. |
| 2009/0141727 | A1 | 6/2009 | Brown et al. |
| 2012/0023340 | A1 * | 1/2012 | Cheung ........................ 713/300 |

OTHER PUBLICATIONS

IP.com, Authors: Anonymously "Method and System for Enabling an InfiniBand over Ethernet (IBoE) Gateway to use IPv4 or IPv6 Protocols", IP.com No. IPCOM000196464D, Jun. 2, 2010, 3 pages.

* cited by examiner

*Primary Examiner* — Andrew Lai
*Assistant Examiner* — Zhiren Qin
(74) *Attorney, Agent, or Firm* — Cynthia G. Seal; Jeffrey L. Streets

(57) ABSTRACT

A networking system includes a host adapter card including a card connector having four transceiver pairs and a mechanical connector configuration, and a controller having control logic for detecting whether a single-channel connection or a four-channel connection is made to the card connector. The controller further includes control logic for communicating over a network using a default, four-channel-protocol in response to detecting the four-channel connection or using an alternative, single-channel-protocol in response to detecting the single-channel connection. The system further includes an alternative-network compatibility device including a first connector configured for releasably mating with the card connector and a second connector having a different mechanical connector configuration than the card connector. The alternative-network compatibility device includes a transceiver lane from the first connector end to the second connector end, which transceiver lane is placed in connection with one of the four transceiver pairs when mated with the card connector.

15 Claims, 3 Drawing Sheets

AUTOMATED PROTOCOL SELECTION FOR HOST ADAPTER CARD

BACKGROUND

1. Field of the Invention

The present invention relates to network connections and high-speed data links between devices of a computer network.

2. Background of the Related Art

Networked computer systems typically include multiple devices interconnected as nodes. The various nodes may include servers and storage devices that are able to communicate with each other over a network. Today, two communication specifications that are used in high-performance computing include Infiniband, which may operate at 40 Gigabits per second (Gbps), and Ethernet, which may operate at 10 Gbps. However, these communication specifications require different mechanical and electrical connectors and cables. In order to implement either network communication specification, the connectors and cables must be very specifically matched according to type.

BRIEF SUMMARY

An example of a networking system is disclosed. The networking system includes a host adapter card including a card connector and a controller. The card connector includes four independent transceiver pairs and a predefined mechanical connector configuration. The controller includes control logic for detecting whether a single-channel connection or a four-channel connection is made to the card connector. The controller further includes control logic for communicating over a network using a default, four-channel protocol in response to detecting the four-channel connection or using an alternative, single-channel protocol in response to detecting the single-channel connection. The system further includes an alternative-network compatibility device including a first connector configured for releasably mating with the card connector and a second connector having a different mechanical connector configuration than the card connector. The alternative-network compatibility device includes a transceiver lane from the first connector end to the second connector end. The transceiver lane is placed in connection with one of the four independent transceiver pairs when mated with the card connector.

A computer program product including computer usable program code embodied on a computer usable storage medium is further disclosed. The computer program product includes computer usable program code for automatically detecting whether a four-channel connection or a single-channel connection has been made to a host adapter. Computer usable program code is also included for invoking a default four-channel protocol in response to detecting the four-channel connection has been made, or for automatically invoking an alternative single-channel protocol in response to detecting the single-channel connection has been made. Computer usable program code is also included for communicating from the host adapter over the network using the invoked one of the default, four-channel protocol and the alternative, single-channel connection using the same host adapter.

DETAILED DESCRIPTION

Systems and methods are disclosed for interfacing a host device with a peripheral device using a single host adapter card capable of operating at either of two different network communication protocols. The two different network communication protocols discussed below are Infiniband and Ethernet, although the use of other communication protocols is within the scope of the invention. Infiniband and Ethernet have different physical connections both mechanically and electrically. Infiniband provides a switched fabric communications link used in high-performance computing, such as in clustering applications in a data center. Using four independent channels, Infiniband provides a quadruple data rate (referred to in the art as QDR) of up to 10 Gigabits per second (Gbps) per channel, for a combined 40 Gbps in either direction. The Ethernet network communication protocol provides a point-to-point link between network nodes. Using a single transmission lane instead of four, an Ethernet connection provides a connection speed of up to 10 Gbps, which is slower than Infiniband but still fast enough for high performance computing applications.

In an example discussed below, a host adapter card includes a single ASIC (Application Specific Integrated Circuit) with control logic for communicating using either Infiniband or Ethernet. The host adapter card includes a single card connector having a QSFP connector, which has a sufficient number of transceiver pairs for communicating on up to four independent channels as required by Infiniband. An Infiniband cable has a QSFP connector at both ends and four serial communication lanes that are used to connect the host adapter card to an Infiniband port of, for example, a peripheral device or a network switch. The ASIC detects the presence of a four-channel connection and defaults to Infiniband. An alternative network compatibility device ("ANCD"), defined herein, is provided for alternatively connecting the host adapter card to Ethernet. The ANCD has a QSFP connector for connecting to the host adapter card, a small form-factor pluggable ("SFP") or enhanced small form-factor pluggable ("SFP+") connector for connecting to an Ethernet port or cable, and a single data transmission and receiver lane between the two connectors. The ANCD also includes encoded information, such as Vital Product Data (VPD), that the ASIC receives to determine that a single-channel connection has been made, and to automatically invoke Ethernet in response. No conversion is made from one network communication protocol to another. Rather, the system allows for communication using either of two different protocols over a different number of channels, depending on whether a standard Infiniband cable or the ANCD is connected.

Figure 1:
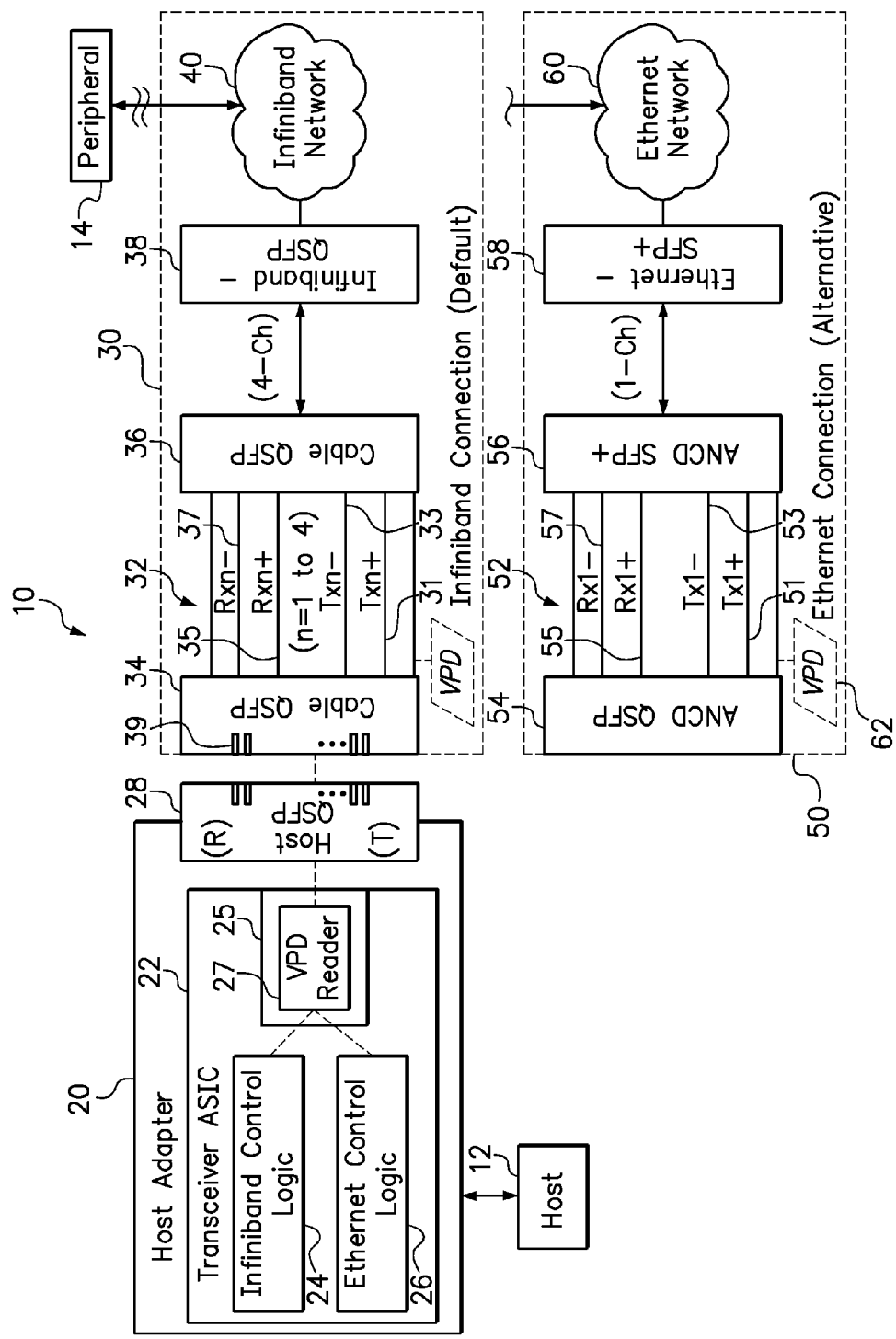
FIG. 1 is a schematic diagram of a dual-protocol networking system providing electronic data communication between a host device and a peripheral device using either Infiniband or Ethernet.

FIG. 1 is a schematic diagram of a dual-protocol networking system generally indicated at 10, providing electronic data communication between a host device ("Host") 12 and a peripheral device ("Peripheral") 14 using either Infiniband or Ethernet. The Host 12 may be a computer that is configurable as a network node, such as a blade server, workstation blade, or compute module. The Peripheral 14 is another device that may also be configurable as a network node, such as another computer or a storage device for storing data and instructions on behalf of the Host 12. The dual-protocol networking system 10 includes a host adapter card 20, which may optionally be installed within the Host. An Infiniband connection 30 may be established by connecting the host adapter card 20 to an Infiniband network 40 using a standard Infiniband cable 32. Alternatively, an Ethernet connection 50 may be established by connecting the host adapter card 20 to an Ethernet network 60 using an alternative network compatibility device (ANCD) 52. The ANCD 52 may be embodied as another cable, or as a rigid coupler. As further described below, the host adapter card 20 automatically selects Infiniband control logic 24 or Ethernet control logic 26 depending on which device is physically connected to the host adapter card 20.

The host adapter card 20 may be embodied as a host channel adapter card having a card connector 28. The host adapter card 20 may interface with a motherboard of the Host 12 using a peripheral component interconnect express (PCIe) connector or other circuit board interface known in the art. The card connector 28 may have a standard card-edge mechanical connector configuration that is externally accessible for connection with either the Infiniband cable 32 or the ANCD 52. By way of example, the card connector 28 is of a QSFP type, and may be alternately referred to as the Host QSFP connector 28. The Host QSFP connector 28 has a predefined mechanical and electrical configuration for mating with another connector of the same type. The electrical configuration includes four independent transmitter (T) differential pairs and four independent receiver (R) differential pairs for communication over four channels in parallel. Each transmitter pair (T) provides a pair of electrical contacts for serial signal transmission using an inverted and non-inverted signal line, as generally understood in the art apart from the particular teachings of this disclosure Likewise, each receiver pair (R) provides a pair of electrical contacts for serial signal receiving using another inverted and non-inverted signal line. Each transmitter pair (T) and corresponding receiver pair (R) may be collectively referred to herein as a transceiver pair.

The host adapter card 20 includes a single ASIC (Application Specific Integrated Circuit) 22 that functions as a dual-protocol transceiver. The ASIC 22 may be included on a circuit board of the host adapter card 20. The ASIC 22 includes both Infiniband control logic 24, for communicating using an Infiniband protocol by default, and Ethernet control logic 26, for alternatively communicating using an Ethernet protocol. The ASIC 22 further includes control logic 25 for detecting whether a single-channel connection or a four-channel connection is made to the Host QSFP connector 28. If a four-channel Infiniband connection is made to the Host QSFP connector 28, the ASIC 22 selects the Infiniband control logic 24. If a single-channel Ethernet connection is made, the ASIC 22 instead selects the Ethernet control logic 26.

The four-channel cable 32 may be a standard Infiniband cable having a first cable QSFP connector 34 at one end and a second cable QSFP connector 36 at another end. Four pairs of transmitter signal lines 31, 33 and four pairs of receiver signal lines 35, 37 extend from terminals 39 of the first cable QSFP connector 34 to corresponding terminals (not shown) on the second cable QSFP connector 36. The terminals 39 may be embodied as pins. Each pair of transmitter signal lines includes a non-inverted transmitter signal line 31 and an inverted transmitter signal line 33 for carrying a differential signal. Likewise, each pair of receiver signal lines includes a non-inverted receiver signal line 35 and an inverted receiver signal line 37. Each pair of transmitter signal lines 31, 33 thus forms a transmitter lane, and each pair of receiver signal lines 35, 37 forms a receiver lane. One receiver lane and one transmitter lane form a channel.

The first cable QSFP connector 34 is compatible with the Host QSFP connector 28 on the host adapter card 20 because both connectors 34, 28 are of the same type. For example, the Host QSFP connector 28 may includes pins and the first cable QSFP connector 34 may include mating sockets. The Host QSFP connector 28 and the first cable QSFP connector 34 have compatible mechanical and electrical configurations so that when mated, the Host QSFP connector 28 and the first cable QSFP connector 34 are releasably joined mechanically, with the four pairs of transmitter signal lines 31, 33 and four pairs of receiver signal lines 35, 37 in electrical communication with the corresponding four transceiver pairs of the card QSFP connector 28. The second cable QSFP connector 36 may plug into an Infiniband (QSFP) port 38, thus completing the Infiniband connection 30. The four pairs of transmitter signal lines 31, 33 and the four pair of receiver signal lines 35, 37 provide four channels for communication between the Host 12 and the Peripheral 14, which is suitable for use with the Infiniband protocol. Each of the four transmitter and receiver lanes is capable of communicating at 10 gigabits per second (Gbps). Collectively, this allows the Host 12 to communicate with the Peripheral 14 at a quadruple data rate (QDR) of up to 40 Gbps over the default Infiniband connection 30.

The alternative network compatibility device (ANCD) 52 is included with the dual-protocol networking system 10 for allowing the host adapter card 20 to be connected instead to the Ethernet network 60, without requiring a different host adapter card 20 or even a different ASIC. The ANCD 52 includes a QSFP connector 54 at one end and a single small form-factor pluggable (SFP) connector 56 at another end. The SFP connector 56, in this instance, is an enhanced small form-factor pluggable (SFP+) connector 56, which is a specific example variant of an SFP connector. A single pair of transmitter signal lines 51, 53 and a single pair of receiver signal lines 55, 57 extend from terminals (not shown) of the ANCD QSFP connector 54 to corresponding terminals on the ANCD SFP+ connector 56. The single pair of transmitter signal lines includes a non-inverted transmitter signal line 51 and an inverted transmitter signal line 53 for carrying a differential signal. Likewise, the single pair of receiver signal lines includes a non-inverted receiver signal line 55 and an inverted receiver signal line 57. The one pair of transmitter signal lines 51, 53 forms a transmitter lane and the one pair of signal lines 55, 57 forms a receiver lane. The one transmitter lane and the one receiver lane form one channel.

The ANCD QSFP connector 54 is compatible with the Host QSFP connector 28 on the host adapter card 20 because both connectors 54, 28 are of the same type. For example, the Host QSFP connector 28 may include pins and the ANCD QSFP connector 54 may include mating sockets, or vice versa. The Host QSFP connector 28 and the ANCD QSFP connector 54 have compatible mechanical and electrical configurations so that when mated, the Host QSFP connector 28 and ANCD QSFP connector 54 are releasably joined mechanically. The ANCD SFP+ connector 56 may plug into an Ethernet port 58, thus completing the Ethernet connection 50. As an alternative, the ANCD SFP+ connection may be integrated as a single mechanical entity coupled to the ANCD QSFP connector 54. The one pair of transmitter signal lines 51, 53 and the one pair of receiver signal lines 55, 57 form a single channel for communication between the Host 12 and the Peripheral 14, which is suitable for use with the Ethernet protocol. For example, the Ethernet connection 50 may allow for communicating at 10 gigabits per second (Gbps).

The single ASIC 22 included with the host adapter card 20 includes both Infiniband control logic 24 and Ethernet control logic 26. Protocol selection control logic 25 is also provided for detecting whether a single-channel or four-channel connection is made and selecting Infiniband or Ethernet in response. The ASIC 22 may invoke the Infiniband control logic 24 by default, or affirmatively in response to connection of the standard, four-channel Infiniband cable 32. When the ANCD 52 is connected to the host adapter card 20, the ASIC 22 detects the presence of the single-channel connection, and automatically selects the alternative Ethernet control logic 26 instead.

The protocol selection control logic 25 may employ a variety of detection methods for detecting whether the Infiniband cable 32 or the ANCD 52 is connected to the host adapter card 20. Any of such detection methods directly or indirectly includes detecting whether a four-channel or single-channel connection is present. In the dual-protocol networking system 10 of FIG. 1, this determination is more specifically made using Vital Product Data (VPD) 62 encoded on at least the ANCD 52. The protocol selection control logic 25 includes a VPD reader 27. The VPD reader 27 reads or receives any VPD 62 that may be included on an attached device in determining whether to invoke the Infiniband control logic 24 or the Ethernet control logic 26. Here, VPD 62 is provided on the ANCD 52. When the ANCD 52 is connected to the host adapter card 20, the VPD reader 27 reads the VPD 62 on the ANCD 52 and the ASIC 22 selects the Ethernet control logic 26.

It is optional whether to include VPD on the Infiniband cable 32. In the dual-protocol networking system 10 of FIG. 1, Infiniband is the default protocol, and no VPD is included on the Infiniband cable 32. Thus, a standard Infiniband cable 32 may be used for forming the Infiniband connection 30. In the absence of any VPD specifying a particular protocol, the ASIC 22 invokes the Infiniband control logic 24 by default. As an alternative, VPD may also be provided on the Infiniband cable 32 specifying a four-channel connection type, or more particularly specifying Infiniband as the desired protocol. The VPD reader may receive the optional VPD from the Infiniband cable 32 to affirmatively invoke the Infiniband control logic 24.

As outlined above, the dual-protocol networking system 10 does not convert data from one protocol to another and no modification to the source data is required. Rather, the system allows for communication using either of two different protocols, which in this example are Infiniband and Ethernet. If the VPD 62 on the ANCD 52 designates an Ethernet connection, the Ethernet control logic 26 and associated circuitry selects the physical and data link layers to communicate using the Ethernet protocol. If the Infiniband cable 32 includes VPD specifying Infiniband as the selected protocol, or if Infiniband is to be selected by default in the absence of VPD, then the Infiniband control logic 24 and associated circuitry changes the physical and data link layers to communicate using the Infiniband protocol.

Figure 2:
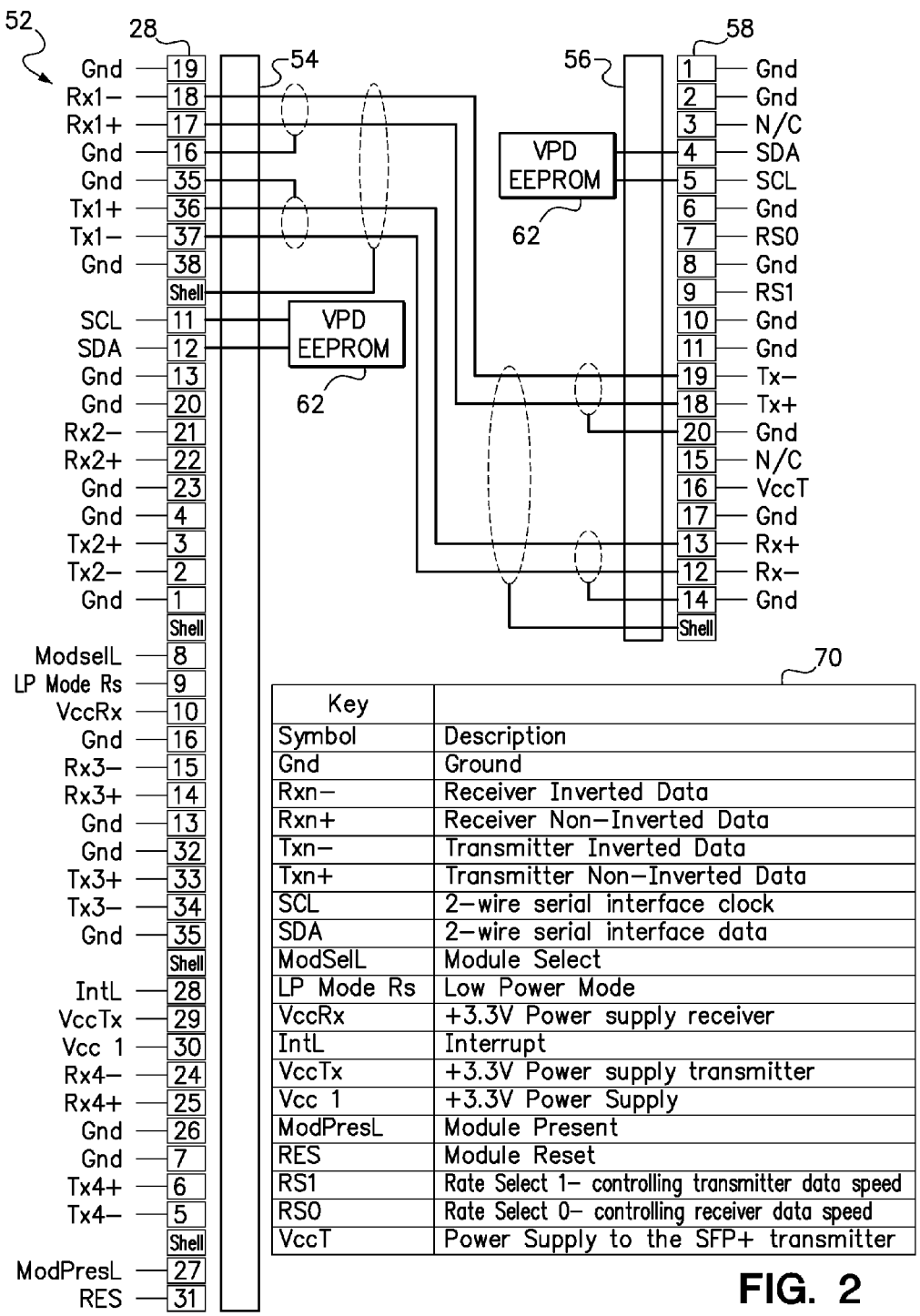
FIG. 2 is a wiring diagram showing an example of signal lines provided in the alternative network compatibility device from the Quadruple Small Form factor Pluggable (QSFP) type connector on the host card adapter to the Ethernet port in the dual-protocol networking system of FIG. 1

FIG. 2 is a wiring diagram or pin-out describing an example of how the signal lines provided in the ANCD 52 are wired from the Host QSFP connector 28 to the Ethernet port 58 in the dual-protocol networking system 10 of FIG. 1. The left side of the wiring diagram details the pin assignments of the Host QSFP connector 28. The right side of the wiring diagram details the pin assignments of the Ethernet port 58. Typically, all of the pins of the Host QSFP connector 28 are used for an Infiniband connection. However, not all of the pins of the Host QSFP connector 28 are required for the Ethernet connection since Ethernet requires only one data channel. Therefore, the ANCD QSFP connector 54 may have a standard QSFP mechanical configuration, but any unused pins of the ANCD QSFP connector 54 need not be physically present. However, if a standard QSFP connector is used for the ANCD QSFP connector, then all of the pins may still be present and simply not connected by the ANCD 52 to pins on the Ethernet port 58. The VPD EEPROM 62 is coupled to the serial data (SDA) terminal and the serial clock (SCL) terminal which provides a low-cost, low-speed, generic Inter-Integrated Circuit ($I^2C$) interface commonly used to communicate information to identify components in a system.

A Key 70 provides a description of the symbols used on the pin assignments. The nomenclature used in the wiring diagram will be understood by one of ordinary skill in the art with reference to the Key 70. For example, the symbols Tx and Rx refer to transmitter and receiver signal pins, respectively, that correspond to the various transmitter and receiver signal lines and terminals in the system diagram of FIG. 1. For instance, on the ANCD QSFP connector 54, Tx1+ to Tx4+ represent four non-inverted transmitter signal pins, Tx1– to Tx4– represent four inverted transmitter signal pins, Rx1+ to Rx4+ represent four non-inverted receiver signal pins, and Rx1– to Rx4– represent four inverted receiver signal pins. However, even though a total of four transmitter pairs and four receiver pairs are available on the ANCD QSFP connector 54, only Rx1+, Rx1–, Tx1+, and Tx1– are needed. These signal lines provide the wiring for the single-channel required for Ethernet.

Figure 3:
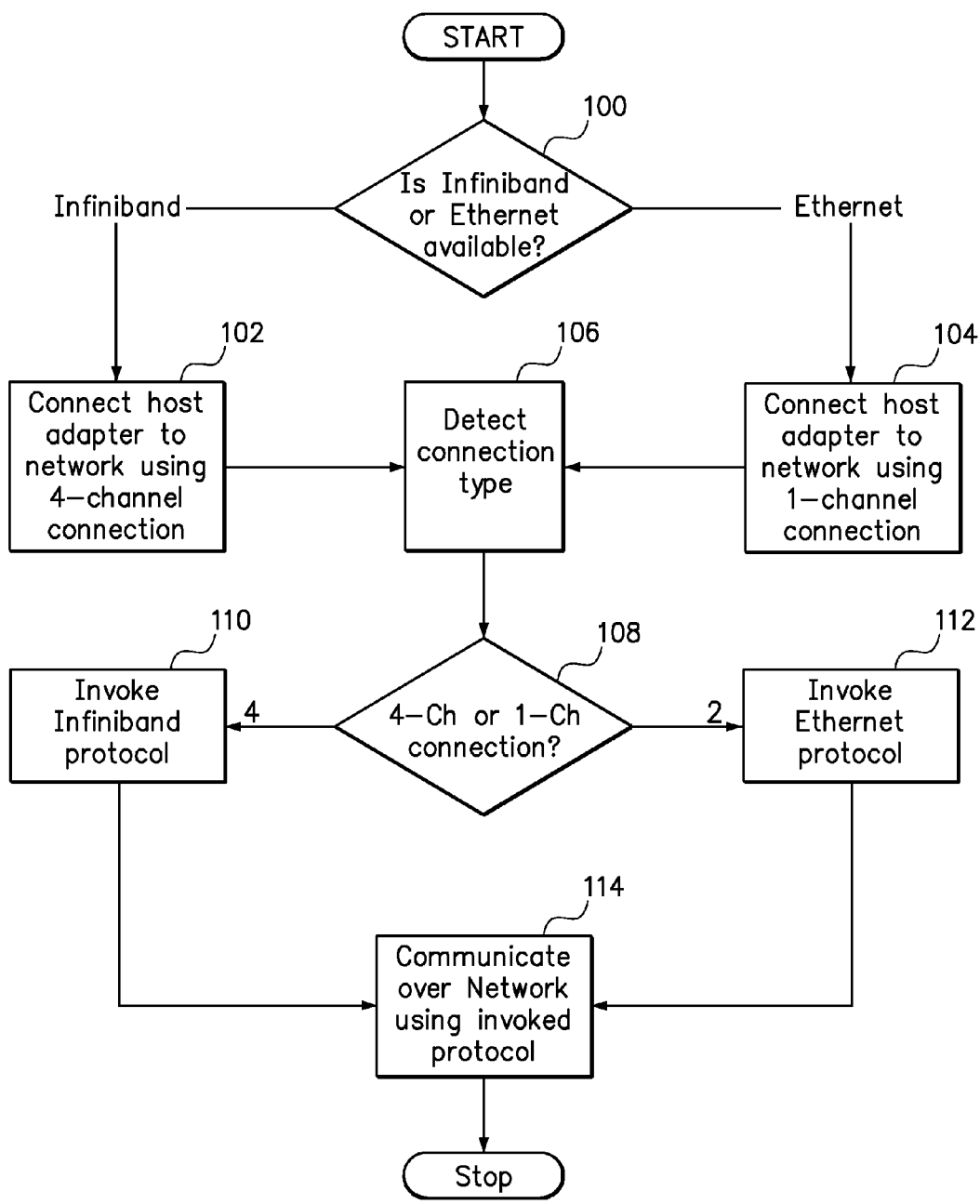
FIG. 3 is a flowchart summarizing an example method of interchangeably communicating using two different network communication protocols using a single host adapter card.

FIG. 3 is a flowchart summarizing an example method of interchangeably communicating using two different network communication protocols using a single host adapter card. The two protocols selected by way of example are Infiniband or Ethernet. In conditional step 100, a determination is made whether an Infiniband or Ethernet connection is available. Whether an Infiniband or Ethernet network is available may be determined manually by a system operator (a human). For example, a particular computer system may predominantly or exclusively communicate using one of Ethernet and Infiniband. Or a system may include both Ethernet and Infiniband ports, but one of the two may be more accessible than the other. In yet another scenario, the particular peripheral to be connected to a host may be capable of interfacing with a host using only one of the two protocols. For example, although the host adapter card may be capable of interchangeably communicating on either of the two protocols, a specific peripheral may be designed for communication using only one of the two protocols.

If Infiniband is available, then the operator may physically connect the host adapter to the network using a four-channel connection according to step 102. The four-channel connection may be made using a standard Infiniband cable, as described with respect to the system 10 of FIG. 1. Alternatively, if Ethernet is available, then the operator may physically connect the host adapter to the network using a single-channel according to step 104. The single-channel connection may be made using an alternative network compatibility device (ANCD), as also described above.

The next step 106 of detecting the connection type may be performed electronically by the host adapter. More specifically, an application-specific integrated circuit (ASIC) on the host adapter may include control logic for detecting the type of connection. As described above, the connection type may be detected by reading Vital Product Data (VPD) encoded on one or both of the Infiniband cable and the ANCD. If only one of the Infiniband cable and the ANCD contain VPD, then the connection type may be determined by default in the absence of VPD. For example, if only the ANCD contains VPD, then the host adapter may automatically assume a four-channel connection is present for Infiniband. According to conditional step 108, if the four-channel connection is detected or assumed, then Infiniband protocol is invoked per step 110. Alternatively, if the single-channel connection is detected, then Ethernet protocol is invoked per step 112. In step 114, the host communicates with the peripheral over the invoked protocol. As an alternative to reading VPD, it is possible to detect the connection type by sending test signals over the connections to determine the number of channels that are connected with a physical wire, such as sending a handshake signal to the peripheral device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A networking system, comprising:
  a host adapter card including a card connector and a controller, the card connector including four independent transceiver pairs and a predefined mechanical connector configuration, the controller including control logic for detecting whether a single-channel physical connection or a four-channel physical connection is made to the card connector and control logic for communicating over a network using a first, four-channel protocol in response to detecting the four-channel physical connection or using an alternative, single-channel protocol in response to detecting the single-channel physical connection; and
  an alternative-network compatibility device including a first connector configured for releasably mating with the card connector and a second connector having a different mechanical connector configuration than the card connector, the alternative-network compatibility device including a transceiver lane from the first connector to the second connector, the transceiver lane of the alternative-network compatibility device being placed in physical connection with one of the four independent transceiver pairs of the card connector when the first connector of the alternative-network compatibility device is mated with the card connector of the host adapter card.

2. The networking system of claim 1, further comprising vital product data (VPD) encoded on the alternative-network compatibility device specifying a single-channel physical connection type; and
  wherein the control logic on the host adapter card for detecting whether the single-channel physical connection or the four-channel physical connection is made to the card connector comprises control logic for reading the VPD from the alternative-network compatibility device and selecting the single-channel protocol in response to determining that the VPD specifies the single-channel connection type.

3. The networking system of claim 2, further comprising:
  a four-channel network cable including vital product data (VPD) specifying a four-channel connection type; and
  wherein the control logic on the host adapter card for detecting whether the single-channel physical connection or the four-channel physical connection is made to the card connector comprises control logic for reading the VPD from the four-channel network cable and affirmatively selecting the default four-channel protocol in response to determining that the VPD specifies the four-channel physical connection type.

4. The networking system of claim 2, wherein the controller is configured to automatically invoke the first, four-channel protocol in the absence of any VPD specifying a particular protocol.

5. The networking system of claim 1, wherein the first, four-channel protocol comprises an InfiniBand protocol and the alternative, single-channel protocol comprises an Ethernet protocol.

6. The networking system of claim 1, wherein the connector on the host adapter card and the first connector on the alternative-network compatibility device have mating quadruple small form-factor pluggable (QSFP) configurations.

7. The networking system of claim 1, wherein the second connector on the alternative-network compatibility device has a single channel, small-form-factor pluggable (SFP) configuration.

8. The networking system of claim 1, wherein the controller on the host adapter card comprises an application specific integrated circuit (ASIC).

9. The networking system of claim 1, further comprising:
  a first network operating on the first, four-channel protocol;
  a first network port operably connected to the first network, the first network port having a mechanical configuration of the same type as the card connector;
  a second network operating on the alternative, single-channel protocol; and
  a second network port operably connected to the second network, the second network port having a mechanical configuration of the same type as the second connector of the alternative-network compatibility device.

10. The network system of claim 9, further comprising:
  a host device in electronic communication with the host adapter card; and
  a peripheral device in communication with the host adapter card using either the first or second network.

11. The network system of claim 10, wherein the host device comprises a computer and the peripheral device comprises a data storage device.

12. A computer program product including computer usable program code embodied on a non-transitory computer readable storage medium, the computer program product comprising:
  computer usable program code for automatically detecting whether a four-channel physical connection or a single-channel physical connection has been made to a host adapter;
  computer usable program code for invoking a default four-channel protocol in response to detecting the four-channel physical connection has been made or invoking an alternative single-channel protocol in response to detecting the single-channel physical connection has been made; and
  computer usable program code for communicating from the host adapter over a network using the invoked one of the default, four-channel protocol and the alternative, single-channel protocol using the same host adapter.

13. The computer program product of claim 12, further comprising:

computer usable program code for supplying Vital Product Data (VPD) to the host adapter in response to making the single-channel physical connection to indicate when the single-channel physical connection has been made; and computer usable program code for determining when the single-channel physical connection has been made by reading and interpreting the VPD.

14. The computer program product of claim 13, further comprising:

computer usable program code for supplying Vital Product Data (VPD) to the host adapter in response to making the four-channel physical connection to indicate when the four-channel physical connection has been made; and computer usable program code for determining when the four-channel physical connection has been made by reading and interpreting the VPD.

15. The computer program product of claim 13, further comprising:

computer usable program code for automatically invoking the default four-channel protocol in the absence of any VPD specifying a particular protocol.

* * * * *